(12) United States Patent
Marupaduga et al.

(10) Patent No.: US 10,104,598 B1
(45) Date of Patent: Oct. 16, 2018

(54) WIRELESS RELAY SCANNING CONTROL IN A WIRELESS DATA COMMUNICATION NETWORK

(71) Applicant: Sprint Communications Company L.P., Overland Park, KS (US)

(72) Inventors: Sreekar Marupaduga, Overland Park, KS (US); Saravana Velusamy, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 42 days.

(21) Appl. No.: 15/335,410

(22) Filed: Oct. 26, 2016

(51) Int. Cl.
| | | |
|---|---|---|
| *H04B 7/14* | (2006.01) | |
| *H04W 48/16* | (2009.01) | |
| *H04W 48/20* | (2009.01) | |
| *H04W 64/00* | (2009.01) | |
| *H04B 7/155* | (2006.01) | |
| *H04W 88/08* | (2009.01) | |
| *H04W 88/16* | (2009.01) | |
| *H04W 16/18* | (2009.01) | |

(52) U.S. Cl.
CPC ........ *H04W 48/16* (2013.01); *H04B 7/15507* (2013.01); *H04W 48/20* (2013.01); *H04W 64/003* (2013.01); *H04W 16/18* (2013.01); *H04W 88/08* (2013.01); *H04W 88/16* (2013.01)

(58) Field of Classification Search
CPC ...... H04B 7/026; H04B 7/14; H04B 7/15507; H04B 7/15542; H04B 7/1555; H04B 7/15557
See application file for complete search history.

(56) References Cited

U.S. PATENT DOCUMENTS

| | | | |
|---|---|---|---|
| 7,668,504 B2 | 2/2010 | Kang et al. | |
| 8,270,908 B2 | 9/2012 | Wang et al. | |
| 8,660,035 B2 | 2/2014 | Zhang et al. | |
| 9,042,282 B2 | 5/2015 | Hirakawa et al. | |
| 2001/0031648 A1* | 10/2001 | Proctor, Jr. ............ | H01Q 1/246 455/562.1 |
| 2011/0110289 A1 | 5/2011 | Venkatachalam et al. | |
| 2014/0162545 A1 | 6/2014 | Edge | |
| 2014/0341585 A1 | 11/2014 | Lee | |
| 2017/0141894 A1* | 5/2017 | Wei ...................... | H04B 17/309 |

FOREIGN PATENT DOCUMENTS

WO      2010002366      1/2010

* cited by examiner

*Primary Examiner* — Alvin Zhu (57) ABSTRACT

A wireless relay controls wireless scanning in a wireless data communication network. The wireless relay scans to wirelessly attach to a source wireless access point. The wireless relay wirelessly receives a scanning code from the source wireless access point. The wireless relay translates the scanning code into an amount of degrees-per-scan. The wireless relay then scans per the amount of degrees-per-scan to wirelessly attach to additional wireless access points. The wireless relay wirelessly exchanges user data through at least one of the additional wireless access points. The scanning code could be Dynamic Host Configuration Protocol (DHCP) server load or latency data.

20 Claims, 6 Drawing Sheets

WIRELESS RELAY SCANNING CONTROL IN A WIRELESS DATA COMMUNICATION NETWORK

TECHNICAL BACKGROUND

Data communication systems exchange user data for user equipment to provide various data communication services. The user equipment may be phones, computers, media players, intelligent machines, and the like. The data communication services might be media streaming, video conferencing, machine-to-machine data transfers, internet access, or some other computerized information service.

Data communication systems use wireless access points to extend the range of their communication services and enable user mobility. The wireless access points perform wireless networking tasks like device handovers, radio interference management, and multipoint coordination. In Long Term Evolution (LTE) networks, the wireless access points are evolved Node Bs (eNodeBs).

To extend the wireless service footprint even more, wireless relays are used between the wireless access points and the user equipment. A wireless relay exchanges wireless signals that transport user data with user equipment. The wireless relay also exchanges corresponding wireless signals that transport the user data with the wireless access points. The wireless relay may attach to several wireless access points to obtain better service for the user equipment.

Each attachment for the wireless relay requires that the access network communicate with a Dynamic Host Configuration Protocol (DHCP) server to obtain an Internet Protocol (IP) address for the attachment. DHCP access uses a Discover Offer Request Acknowledge (DORA) process that requires several messages per attachment. If the wireless relay attaches to 12 wireless access points, then the DHCP server is contacted 12 times to get 12 IP addresses for the wireless relay. The DORA messaging for multiple wireless relay attachments is significant. Unfortunately, the relay attachment situation is exacerbated when multiple wireless relays attach at the same time—perhaps after a power outage. The use of a DHCP server in this manner becomes expensive and time-consuming.

TECHNICAL OVERVIEW

A wireless relay controls wireless scanning in a wireless data communication network. The wireless relay scans to wirelessly attach to a source wireless access point. The wireless relay wirelessly receives a scanning code from the source wireless access point. The wireless relay translates the scanning code into an amount of degrees-per-scan. The wireless relay then scans per the amount of degrees-per-scan to wirelessly attach to additional wireless access points. The wireless relay wirelessly exchanges user data through at least one of the additional wireless access points. The scanning code could be Dynamic Host Configuration Protocol (DHCP) server load or latency data.

DETAILED DESCRIPTION

Figure 1:
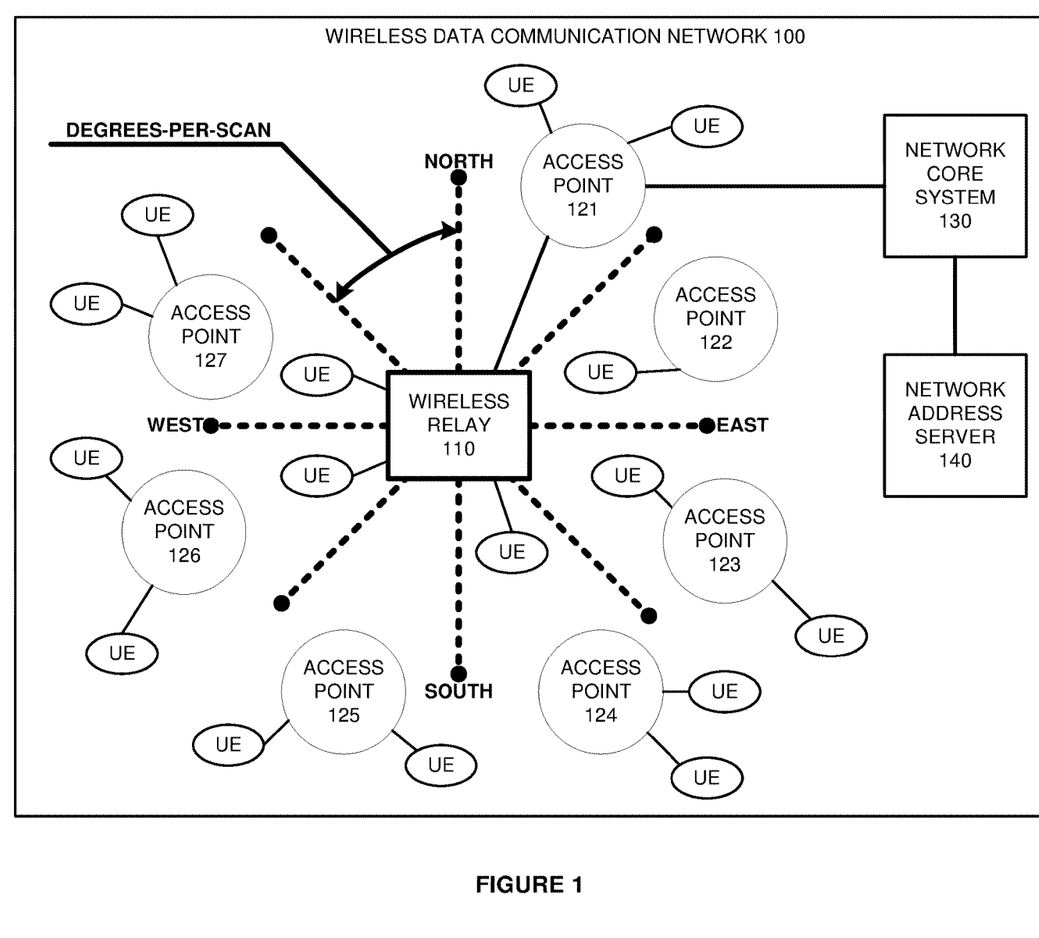
FIGS. 1-4 illustrate a wireless data communication network with a wireless relay that controls wireless scanning based on scanning codes from the wireless network.

FIGS. 1-4 illustrate wireless data communication network 100 with wireless relay 110 that controls wireless scanning based on scanning codes from wireless network 100. Referring to FIG. 1, wireless data communication network 100 exchanges user data for various User Equipment (UE). Each UE comprises a computer, phone, or some other intelligent machine with a wireless communication transceiver. These data exchanges support data services such as content streaming, media conferencing, machine communications, internet access, or some other computerized information service.

Wireless data communication network 100 comprises wireless relay 110, wireless access points 121-127, network core system 130, and network address server 140. Wireless relay 110 includes a wireless transceiver to serve some of the UEs. Wireless relay 110 also includes another wireless transceiver to communicate with wireless access points 121-127. Wireless relay 110 comprises antennas, modulators, amplifiers, filters, and signal processing circuitry. Wireless relay 110 also includes data processing systems with circuitry, memory, and software.

Wireless access points 121-127 comprise antennas, modulators, amplifiers, filters, and signal processing circuitry for wireless communication with the UEs and with wireless relay 110. Wireless access points 121-127 include network interfaces like switches and routers for data communications with network core system 130. Wireless access points 121-127 include data processing systems with circuitry, memory, and software. In some examples, wireless access points 121-127 comprise Long Term Evolution (LTE) evolved Node Bs (eNodeBs).

Network core system 130 comprises computer equipment with software, such as packet gateways, network controllers, authorization databases, and the like. In some examples, network core system 130 comprises an LTE or System Architecture Evolution (SAE) core. The LTE/SAE core typically includes Serving Gateways (S-GWs), Mobility Management Entities (MMEs), Home Subscriber Systems (HSS), Packet Data Network Gateways (P-GWs), and Policy Charging Rules Functions (PCRFs).

Network address server 140 comprises computer equipment with software to serve network addresses and related networking data. An exemplary network address server 140 is a Dynamic Host Configuration Protocol (DHCP) server that uses the Discover Offer Request Acknowledge (DORA) process. The network addresses may be Internet Protocol (IP) addresses and IP ports.

Prior to serving any UEs, wireless relay 110 individually attaches to multiple wireless access points 121-127. The wireless access point attachments may be part of the boot-up or reset process for wireless relay 110. Wireless relay 110 performs an initial wireless scan to attach to source wireless access point 121. The initial scan could be a 360-degree scan or could start at a given direction and rotate until an adequate wireless signal is received. Other scanning techniques could be used to select the source wireless access point. Wireless relay 110 wirelessly attaches to source wireless access point 121. For example, wireless relay 110 may perform a LTE Radio Resource Control (RRC) attachment process.

Wireless relay 110 wirelessly receives a scanning code from source wireless access point 121. The scanning code could be a load or latency indicator for network address server 140. The scanning code could indicate the total number of wireless scans or attachments to use. The scanning code could be transported in an RRC Connection Reconfiguration message.

Wireless relay 110 translates the scanning code into an amount of degrees-per-scan. The amount of degrees-per-scan designates a geographic angle on the X-Y plane corresponding to the Earth's surface—referred to as an azimuth or a sector. With 90 degrees-per-scan, four scans are needed to cover the full 360 degrees. With 30 degrees-per-scan, 12 scans are needed to cover the full 360 degrees. Wireless relay 110 performs wireless scans at the designated degrees-per-scan to select and attach to additional wireless access points. If multiple wireless access points are detected in the same azimuth or sector, then wireless relay 110 selects the wireless access point with the strongest wireless signal or best signal quality.

For example, wireless relay 110 might scan the sectors in rotation from the source access point at the designated degrees-per-scan until 360 degrees covered. In an alternative, wireless relay 110 may start at north and perform scans in rotation at the designated degrees-per-scan until 360 degrees covered. The scan that includes source wireless access point 121 could be skipped. Wireless relay 110 wirelessly exchanges user data through source wireless access point 121 and the additional wireless access points.

In addition to the scanning code, wireless relay 110 may determine or receive its geographic location and translate both the scanning code and the location into the degrees-per-scan. For example, wireless relay 110 might enter a table with its location and then branch toward its scanning code to get the degrees-per-scan. In a like manner, wireless relay may determine a wireless signal metric, such as signal quality from source wireless access point 121, and translate the scanning code and the wireless signal metric into the degrees-per-scan. For relay chains or trees, wireless relay 110 could determine a relay hop-count and translate the scanning code and the hop-count into the degrees-per-scan. Combinations of factors could be considered along with the scanning code.

Advantageously, wireless relay 110 applies intelligence to control the number of wireless scans and attachments that are performed at boot-up or reset. Network core system 130 may configure the scanning codes to assert control over the number of scans. The scanning control can be used to reduce the load on network address server 140 during mass attachment events like the return from a power outage. The scanning control can be used to assert Quality-of-Service (QoS) for wireless relays by differentiating the number of scans and wireless access points that are allowed per relay.

Figure 2:
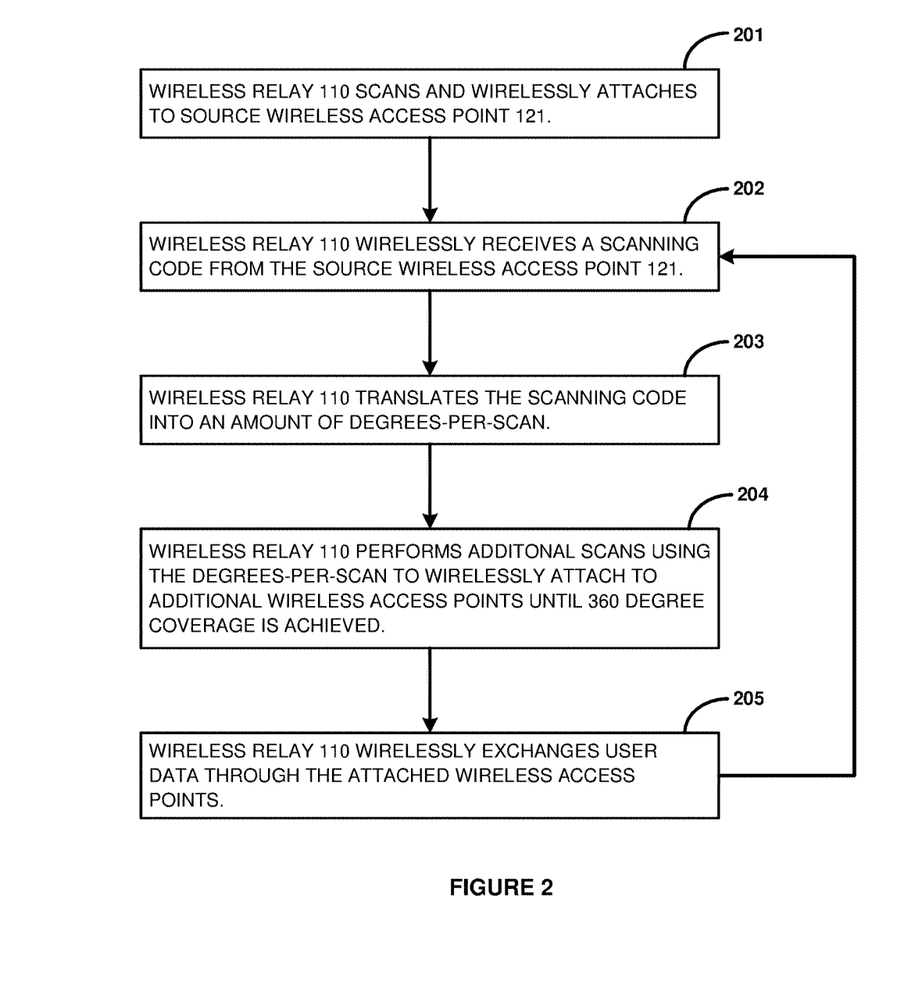

FIG. 2 illustrates the operation of wireless relay 110 to control wireless scanning based on scanning codes from wireless data communication network 100. Wireless relay 110 performs a wireless scan to attach to source wireless access point 121 (201). Wireless relay 110 wirelessly receives a scanning code from source wireless access point 121 (202). The scanning code could be a load or latency indicator for network address server 140.

Wireless relay 110 translates the scanning code into an amount of degrees-per-scan (203). The degrees-per-scan designates the azimuth of the geographic sector on the earth's surface for the scan. Wireless relay 110 uses a table, algorithm, or some other data process to perform the translation. Wireless relay 110 then performs wireless scans at the designated degrees-per-scan to select and attach to additional wireless access points until 360-degree coverage is achieved (204). If multiple wireless access points are detected in the same scanning sector, then wireless relay 110 selects the wireless access point with the strongest wireless signal. In addition to the scanning code, wireless relay 110 may translate the scanning code and other data into the degrees-per-scan. The other data might include relay location, access signal quality, relay hop-count, relay type, and the like. Wireless relay 110 wirelessly then exchanges user data through the attached wireless access points (205). Th operation returns to process 202.

Figure 3:
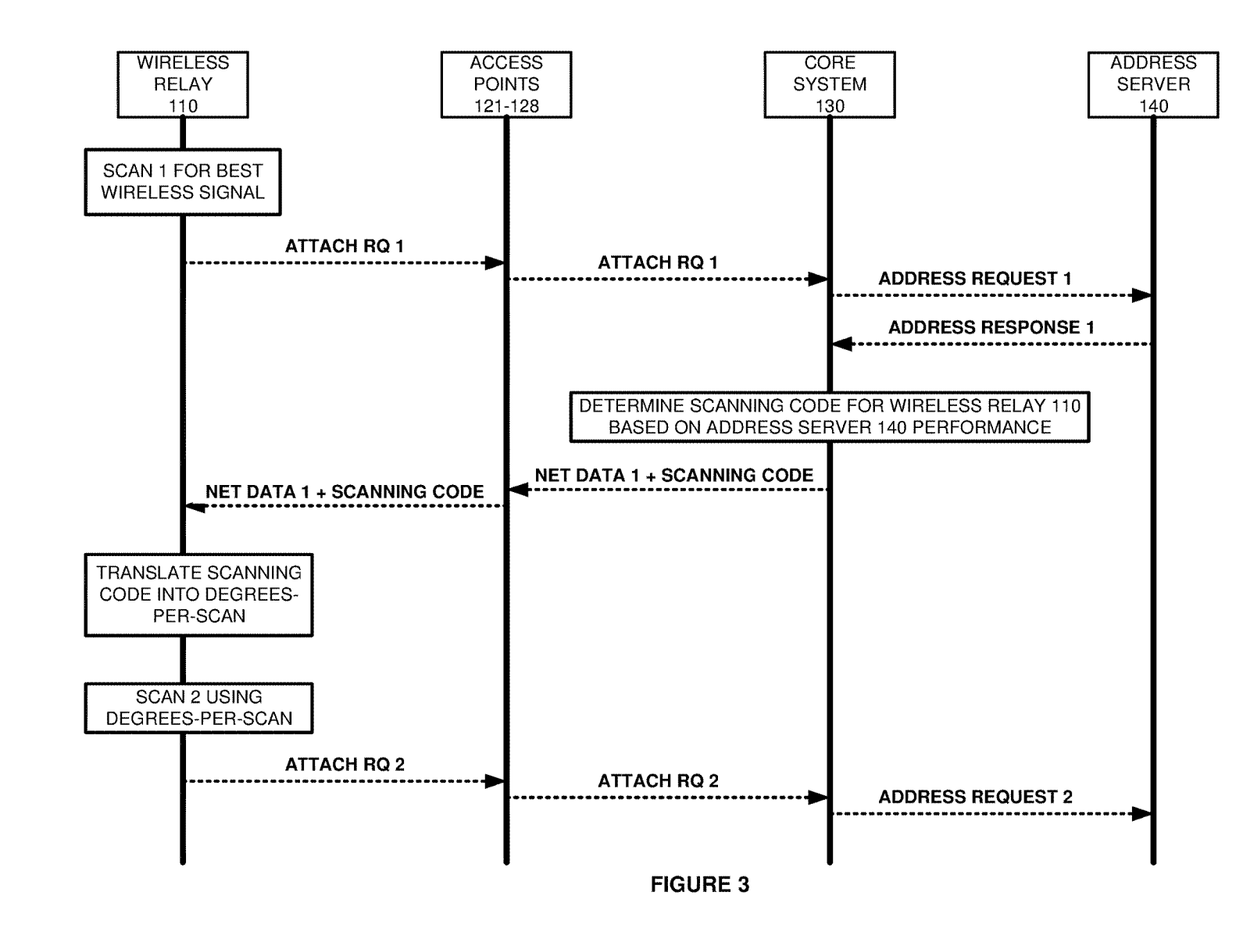
Figure 4:
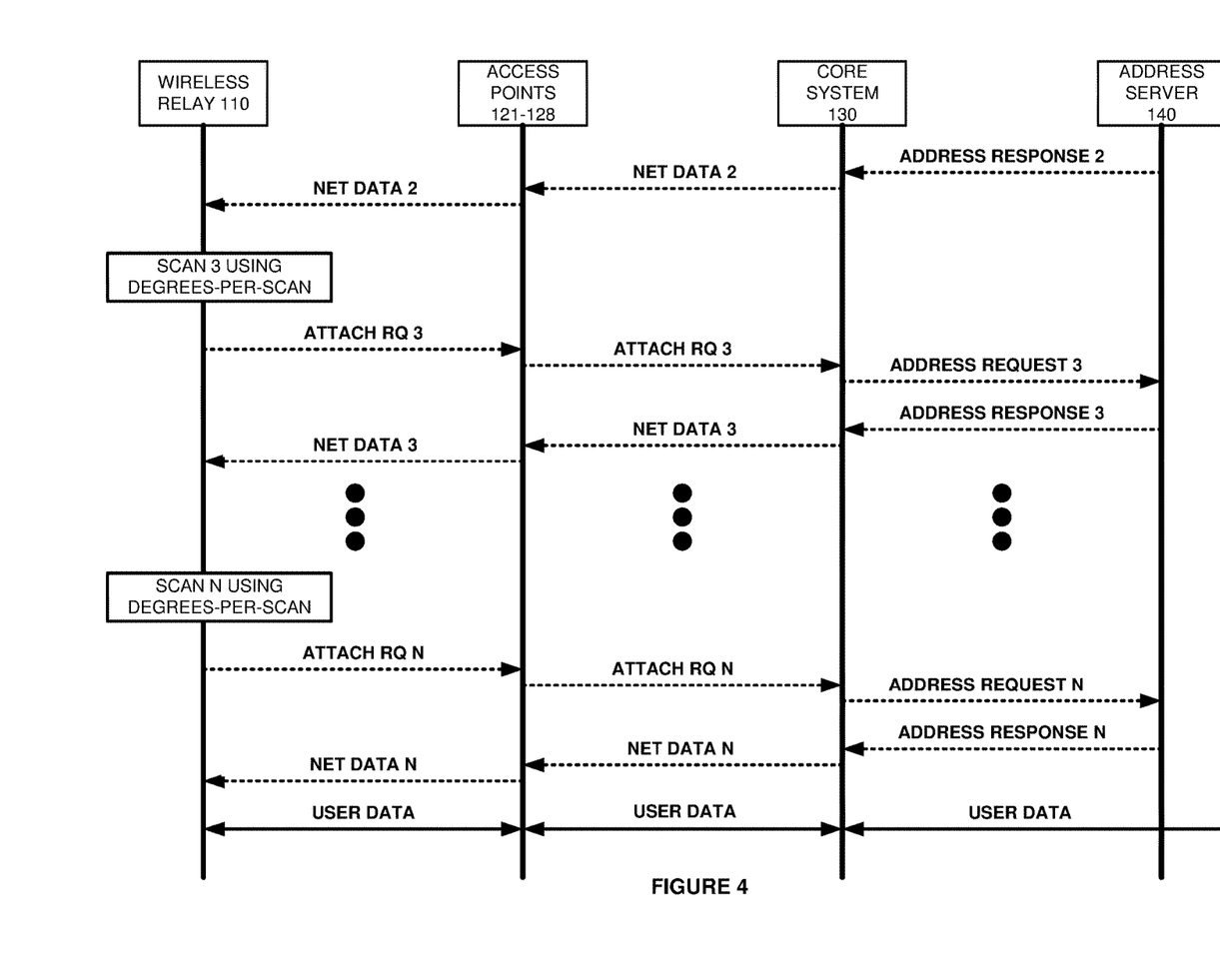

FIGS. 3-4 illustrates the operation of wireless data communication network 100 to control wireless scanning in wireless relay 110 based on scanning codes. Referring to FIG. 3, wireless relay 110 performs an initial wireless scan to select a source wireless access point. Wireless relay 110 wirelessly transfers a first attachment request (RQ) to the source wireless access point. The source wireless access point transfers a corresponding first attachment request to network core system 130. These first attachment requests may be LTE RRC and S1-MME messages respectively.

Network core system 130 receives the first attachment request and transfers a first network address request to network address server 140. Network address server 140 returns a first network address response having first network data (network address and bearer quality) for wireless relay 110 to network core system 130. The network data may include load and/or latency data for network address server 140. This network address retrieval may use the DORA process.

Network core system 130 determines a scanning code for wireless relay 110 based on the performance of network address server 140. Network core system 130 uses a table, algorithm, or some other data process to correlate server performance to the proper scanning code. Core network system 130 may measure server performance directly or get the performance information from another system, including network address server 140. Network core system 130 transfers the first network data and the scanning code to the source wireless access point. The source wireless access point transfers the first network data and the scanning code to wireless relay 110.

Wireless relay 110 wirelessly receives the first network data and the scanning code from the source wireless access point—perhaps in an RRC Connection Reconfiguration message. Wireless relay 110 translates the scanning code into the degrees-per-scan. Wireless relay 110 performs a second wireless scan at the designated degrees-per-scan to select a second wireless access point. If multiple wireless access points are detected in the second scan, then wireless relay 110 selects the wireless access point with the strongest wireless signal. Wireless relay 110 wirelessly transfers a second attachment request to the second wireless access point. The second wireless access point transfers a corresponding second attachment request to network core system 130. Network core system 130 receives the second attachment request and transfers a second network address request to network address server 140.

Referring to FIG. 4, network address server 140 returns a second network address response to network core system 130 having second network data for wireless relay 110. Network core system 130 transfers the second network data to the second wireless access point. The second wireless access point transfers the second network data to wireless relay 110. Wireless relay 110 wirelessly receives the second network data from the second wireless access point.

Wireless relay 110 performs additional wireless scans at the designated degrees-per-scan to select and attach to additional wireless access points. Eventually, wireless relay 110 performs an Nth wireless scan at the designated degrees-per-scan to cover a full 360-degrees. Wireless relay 110 selects and attaches to the Nth wireless access point. Wireless relay 110 wirelessly transfers an Nth attachment request to the Nth wireless access point.

The Nth wireless access point transfers a corresponding Nth attachment request to network core system 130. Network core system 130 receives the Nth attachment request and transfers an Nth network address request to network address server 140. Network address server 140 returns an Nth network address response having Nth network data for wireless relay 110 to network core system 130. Network core system 130 transfers the Nth network data to the Nth wireless access point. The Nth wireless access point transfers the Nth network data to wireless relay 110.

Wireless relay 110 wirelessly exchanges user data through the attached wireless access points 1-N. Advantageously, wireless relay 110 controls the number of wireless scans and attachment attempts that it performs. Network core system 130 directs the process with scanning codes.

Figure 5:
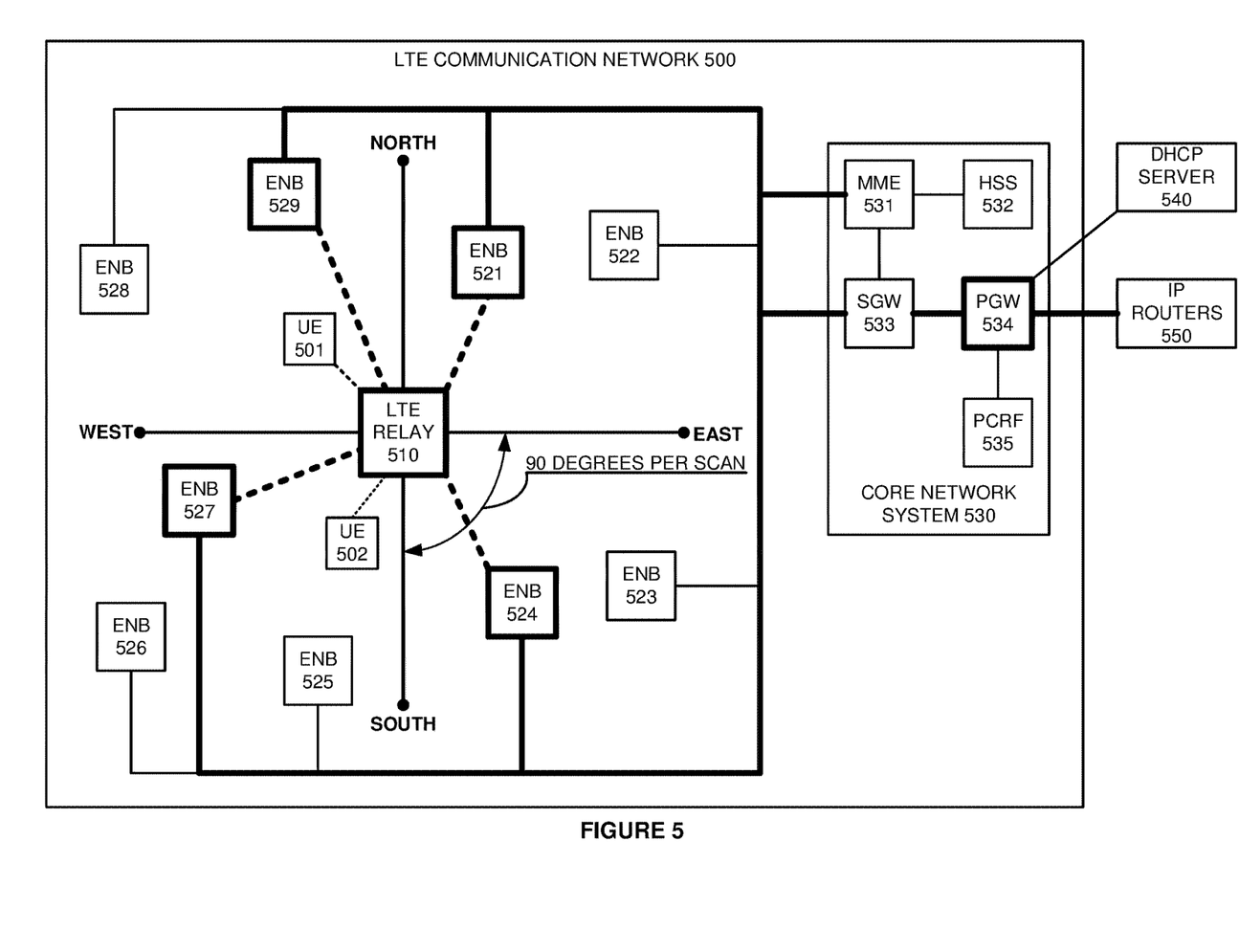
FIG. 5 illustrates a Long Term Evolution (LTE) communication network with a wireless relay that controls wireless scanning based on Dynamic Host Configuration Protocol (DHCP) load or latency data generated by a Packet Data Network Gateway (P-GW).

FIG. 5 illustrates Long Term Evolution (LTE) communication network 500 with wireless relay 510 that controls wireless scanning based on Dynamic Host Configuration Protocol (DHCP) load or latency data generated by a Packet Data Network Gateway (P-GW) 534. LTE communication network 500 is an example of wireless data communication network 100, although network 100 may use alternative configurations and operations. LTE communication network 500 comprises UEs 501-502, wireless relay 510, eNodeBs (ENB) 521-529, and core network system 530. Core network system 530 comprises Mobility Management Entity (MME) 531, Home Subscriber System (HSS) 532, Serving Gateway (S-GW) 533, Packet Data Network Gateway (P-GW) 534, and Policy Charging Rules Function (PCRF) 535.

Before UEs 501-502 attach, wireless relay 510 scans and attaches to source eNodeB 521 using an LTE Radio Resource Control (RRC) attachment process. Source eNodeB 521 transfers a corresponding S1-MME Initial UE request for wireless relay 510 to MME 531 in network core system 530. MME 531 receives the S1-MME Initial UE request and exchanges Diameter messages with HSS 532 to authenticate and authorize wireless relay 510. MME 531 receives an Access Point Name (APN) for wireless relay 510 from HSS 532. MME 531 then transfers an S11 Create Session request with the APN to S-GW 533. S-GW 533 transfers an S5 Create Bearer request with the APN to P-GW 534. P-GW 534 exchanges Diameter messages with PCRF 535 to translate the APN into a Quality-of-Service Class Indicator (QCI) for wireless relay 510. P-GW 534 receives the QCI for wireless relay 510 from PCRF 535.

P-GW 534 then exchanges IP messaging with DHCP server 540 in a DORA session to obtain IP addressing (address, port, version) and related networking data (Options, VLAN, DNS, EMS). P-GW 534 determines load and/or latency metrics for DHCP server 540. DHCP server 540 may measure and provide these metrics to P-GW 534 or P-GW may measure them directly. P-GW 534 transfers an S5 Create Bearer response for wireless relay 510 to S-GW 533. The S5 Create Bearer response indicates the DHCP server load/latency data, APN, QCI, IP addressing, and related networking data. S-GW 533 transfers an S11 Create Session response for wireless relay 510 to MME 531. The S11 Create Session response indicates the DHCP server load/latency data, APN, QCI, IP addressing, and related networking data.

MME 531 transfers an S1-MME Initial Session Context request for wireless relay 510 to eNodeB 521. The S1-MME Initial Session Context request indicates the DHCP server load/latency data, APN, QCI, IP addressing, and related networking data for wireless relay 510. Source eNodeB 521 transfers an RRC Connection Configuration request to wireless relay 510. The RRC Connection Reconfiguration request indicates the DHCP server load/latency data, APN, QCI, IP addressing, and related networking data for wireless relay 510.

Wireless relay 510 translates the DHCP server load/latency data into an amount of degrees-per-scan. The amount of degrees-per-scan designates a geographic azimuth or sector over the Earth's surface. In this example, wireless relay 510 translates the DHCP server load/latency data into 90 degrees-per-scan, so four scans are needed to cover a full 360 degrees. Other degrees-per-scan numbers could be used like 60 degrees for 6 scans or 15 degrees for 24 scans. In addition to the DHCP load/latency data, wireless relay 510 may translate both the DHCP data and other data into the degrees-per-scan. The other data may comprise relay location, source wireless signal quality, relay hop-count, relay type, or some other networking information.

The first scan for source eNodeB 521 has been completed, so wireless relay 110 proceeds to the second scan. Wireless relay 510 scans at 90 degrees and attaches to second eNodeB 524 (instead of eNodeB 523) using the LTE RRC attachment process. eNodeB 524 transfers a corresponding S1-MME Initial UE request for wireless relay 510 to MME 531 in network core system 530. MME 531 receives the S1-MME Initial UE request and exchanges Diameter messages with HSS 532 to authenticate and authorize wireless relay 510. MME 531 receives an APN for wireless relay 510 from HSS 532. MME 531 then transfers an S11 Create Session request with the APN to S-GW 533. S-GW 533 transfers an S5 Create Bearer request with the APN to P-GW 534. P-GW 534 exchanges Diameter messages with PCRF 535 to translate the APN into a QCI for wireless relay 510. P-GW 534 receives the QCI for wireless relay 510 from PCRF 535.

P-GW 534 then exchanges IP messaging with DHCP server 540 in a DORA session to obtain second IP addressing (address, port, version) and related networking data (Options, VLAN, DNS, EMS). P-GW 534 transfers an S5 Create Bearer response for wireless relay 510 to S-GW 533. The S5 Create Bearer response indicates the APN, QCI, second IP addressing, and related networking data. S-GW 533 transfers an S11 Create Session response for wireless relay 510 to MME 531. The S11 Create Session response indicates the APN, QCI, second IP addressing, and related networking data.

MME 531 transfers an S1-MME Initial Session Context request for wireless relay 510 to second eNodeB 524. The S1-MME Initial Session Context request indicates the APN, QCI, second IP addressing, and related networking data for wireless relay 510. Second eNodeB 524 transfers an RRC Connection Configuration request to wireless relay 510. The RRC Connection Reconfiguration request indicates the APN, QCI, second IP addressing, and related networking data for wireless relay 510.

Wireless relay 510 then scans at 90 degrees and attaches to third eNodeB 527 (instead of eNodeBs 525-526). Third eNodeB 527 transfers a corresponding S1-MME Initial UE request for wireless relay 510 to MME 531 in network core system 530. MME 531 receives the S1-MME Initial UE request and exchanges Diameter messages with HSS 532 to authenticate and authorize wireless relay 510. MME 531 receives an APN for wireless relay 510 from HSS 532. MME 531 then transfers an S11 Create Session request with the APN to S-GW 533. S-GW 533 transfers an S5 Create Bearer request with the APN to P-GW 534. P-GW 534 exchanges Diameter messages with PCRF 535 to translate the APN into a QCI for wireless relay 510. P-GW 534 receives the QCI for wireless relay 510 from PCRF 535.

P-GW 534 then exchanges IP messaging with DHCP server 540 in a DORA session to obtain third IP addressing and related networking data. P-GW 534 transfers an S5 Create Bearer response for wireless relay 510 to S-GW 533. The S5 Create Bearer response indicates the APN, QCI, third IP addressing, and related networking data. S-GW 533 transfers an S11 Create Session response for wireless relay 510 to MME 531. The S11 Create Session response indicates the APN, QCI, third IP addressing, and related networking data.

MME 531 transfers an S1-MME Initial Session Context request for wireless relay 510 to third eNodeB 527. The S1-MME Initial Session Context request indicates the APN, QCI, third IP addressing, and related networking data for wireless relay 510. Third eNodeB 527 transfers an RRC Connection Configuration request to wireless relay 510. The RRC Connection Reconfiguration request indicates the APN, QCI, third IP addressing, and related networking data for wireless relay 510.

Wireless relay 510 then scans at 90 degrees and attaches to fourth eNodeB 529 (instead of eNodeB 528). Fourth eNodeB 529 transfers a corresponding S1-MME Initial UE request for wireless relay 510 to MME 531 in network core system 530. MME 531 receives the S1-MME Initial UE request and exchanges Diameter messages with HSS 532 to authenticate and authorize wireless relay 510. MME 531 receives an APN for wireless relay 510 from HSS 532. MME 531 then transfers an S11 Create Session request with the APN to S-GW 533. S-GW 533 transfers an S5 Create Bearer request with the APN to P-GW 534. P-GW 534 exchanges Diameter messages with PCRF 535 to translate the APN into a QCI for wireless relay 510. P-GW 534 receives the QCI for wireless relay 510 from PCRF 535.

P-GW 534 then exchanges IP messaging with DHCP server 540 in a DORA session to obtain fourth IP addressing and related networking data. P-GW 534 transfers an S5 Create Bearer response for wireless relay 510 to S-GW 533. The S5 Create Bearer response indicates the APN, QCI, fourth IP addressing, and related networking data. S-GW 533 transfers an S11 Create Session response for wireless relay 510 to MME 531. The S11 Create Session response indicates the APN, QCI, fourth IP addressing, and related networking data.

MME 531 transfers an S1-MME Initial Session Context request for wireless relay 510 to fourth eNodeB 529. The S1-MME Initial Session Context request indicates the APN, QCI, fourth IP addressing, and related networking data for wireless relay 510. Fourth eNodeB 529 transfers an RRC Connection Configuration request to wireless relay 510. The RRC Connection Reconfiguration request indicates the APN, QCI, fourth IP addressing, and related networking data for wireless relay 510.

UEs 501-502 then wirelessly attach to wireless relay 510. UEs 501-502 exchange wireless user data with wireless relay 510. Wireless relay 510 wirelessly exchanges the user data with attached eNodeBs 521, 524, 527, and 529. Attached eNodeBs 521, 524, 527, and 529 exchange the user data with S-GW 533. S-GW 533 exchanges the user data with P-GW 534. P-GW 534 exchanges the user data with IP routers 550 for subsequent handling.

Advantageously, wireless relay 510 controls the number of wireless scans and eNodeB attachments that it performs based on the load and/or latency of DHCP server 540. P-GW 534 serves the DHCP load/latency data to wireless relay 510 during the initial attachment to the source eNodeB.

Figure 6:
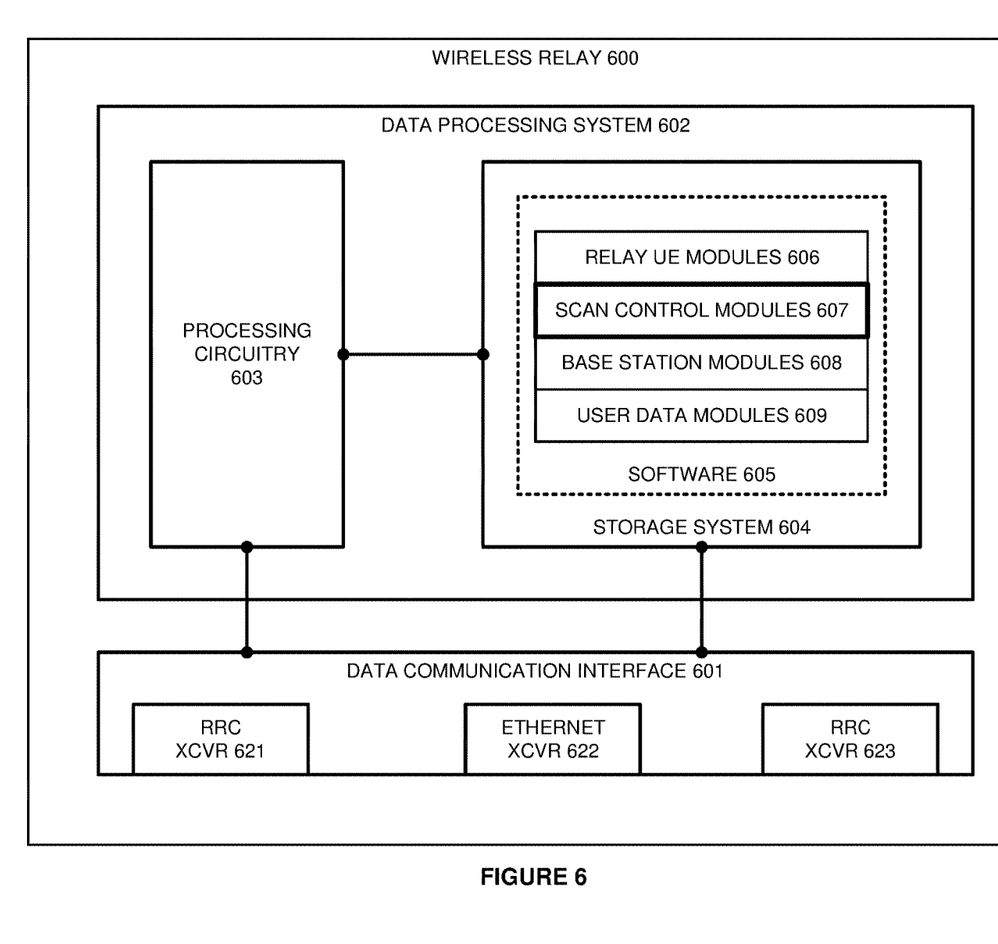
FIG. 6 illustrates a wireless relay to control wireless scanning based on scanning codes from a wireless data communication network.

FIG. 6 illustrates wireless relay 600 to control wireless scanning based on scanning codes from a wireless data communication network. Wireless relay 600 is an example of wireless relays 110 and 510, although relays 110 and 510 may use alternative configurations and operations. Wireless relay 600 comprises data communication interface 601 and data processing system 602. Data communication interface 601 comprises RRC transceiver 621, Ethernet transceiver 622, and RRC transceiver 623. Data processing system 602 comprises processing circuitry 603 and storage system 604. Storage system 604 stores software 605. Software 605 includes respective software modules 606-609.

Transceivers 621-623 comprise communication components, such as antennas, amplifiers, filters, modulators, ports, bus interfaces, digital signal processors, memory, software, and the like. Processing circuitry 603 comprises circuit boards, bus interfaces, integrated micro-processing circuitry, and associated electronics. Storage system 604 comprises non-transitory, machine-readable, data storage media, such as flash drives, disc drives, memory circuitry, data servers, and the like. Software 605 comprises machine-readable instructions that control the operation of processing circuitry 603 when executed. Wireless relay 600 may be centralized or distributed. All or portions of software 606-609 may be externally stored on one or more storage media, such as circuitry, discs, and the like. Some conventional aspects of wireless relay 600 are omitted for clarity, such as power supplies, enclosures, and the like.

When executed by processing circuitry 603, software modules 606-609 direct circuitry 603 to perform the following operations. Relay UE modules 606 direct RRC transceiver 623 to interact with donor eNodeBs. Relay UE modules 606 scan for donor eNodeBs under the direction of scan control modules 607. Thus, Relay UE modules 606 direct RRC transceiver 623 to detect the wireless access points in a sector that is geographically bounded by the degrees-per-scan. Relay UE modules 606 rotate and repeat the scans to achieve 360-degree coverage.

Scan control modules 607 process scanning codes like DHCP load or latency to select the degrees-per-scan for relay UE modules 606. Base station modules 608 direct RRC transceiver 621 to interact with UEs. User data modules 609 exchange user data between transceivers 621-623.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless relay to control wireless scanning in a wireless data communication network, the method comprising:

the wireless relay scanning to wirelessly attach to a source wireless access point;

the wireless relay wirelessly receiving a scanning code from the source wireless access point;

the wireless relay translating the scanning code into an amount of degrees-per-scan;

the wireless relay scanning per the amount of degrees-per-scan to wirelessly attach to additional wireless access points; and the wireless relay wirelessly exchanging user data through at least one of the additional wireless access points.

2. The method of claim 1 wherein translating the scanning code into the amount of degrees-per-scan comprises the wireless relay translating the scanning code and a wireless relay location into the amount of degrees-per-scan.

3. The method of claim 1 wherein the wireless relay translating the scanning code into the amount of degrees-per-scan comprises the wireless relay translating the scanning code and a wireless signal measurement into the amount of degrees-per-scan.

4. The method of claim 1 wherein the wireless relay translating the scanning code into the amount of degrees-per-scan comprises the wireless relay translating the scanning code and a wireless relay type into the amount of degrees-per-scan.

5. The method of claim 1 wherein the wireless relay translating the scanning code into the amount of degrees-per-scan comprises the wireless relay translating the scanning code and a wireless relay hop count into the amount of degrees-per-scan.

6. The method of claim 1 wherein the wireless relay wirelessly receiving the scanning code from the source wireless access point comprises the wireless relay wirelessly receiving the scanning code in a Radio Resource Control (RRC) message from the source wireless access point.

7. The method of claim 1 wherein the wireless relay wirelessly receiving the scanning code from the source wireless access point comprises the wireless relay wirelessly receiving the scanning code in a Radio Resource Control (RRC) Connection Reconfiguration message from the source wireless access point.

8. The method of claim 1 wherein the wireless relay receiving and translating the scanning code comprises the wireless relay receiving and translating Dynamic Host Configuration Protocol (DHCP) data generated by a Packet Data Network Gateway (P-GW).

9. The method of claim 1 wherein the wireless relay receiving and translating the scanning code comprises the wireless relay receiving and translating a load for a Dynamic Host Configuration Protocol (DHCP) server.

10. The method of claim 1 wherein the wireless relay receiving and translating the scanning code comprises the wireless relay receiving and translating a latency for a Dynamic Host Configuration Protocol (DHCP) server.

11. A wireless relay to control wireless scanning in a wireless data communication network, the wireless relay comprising:

a wireless transceiver configured to scan and wirelessly attach to a source wireless access point;

the wireless transceiver configured to wirelessly receive a scanning code from the source wireless access point;

a data processing system configured to translate the scanning code into an amount of degrees-per-scan;

the wireless transceiver configured to scan per the amount of degrees-per-scan to wirelessly attach to additional wireless access points; and the wireless transceiver configured to wirelessly exchange user data through at least one of the additional wireless access points.

12. The wireless relay of claim 11 wherein the data processing system is further configured to translate the scanning code and a wireless relay location into the amount of degrees-per-scan.

13. The wireless relay of claim 11 wherein:

the wireless transceiver is further configured to determine a wireless signal metric; and the data processing system is further configured to translate the scanning code and the wireless signal measurement into the amount of degrees-per-scan.

14. The wireless relay of claim 11 wherein the data processing system is further configured to translate the scanning code and a wireless relay type into the amount of degrees-per-scan.

15. The wireless relay of claim 11 wherein the data processing system is further configured to translate the scanning code and a wireless relay hop count into the amount of degrees-per-scan.

16. The wireless relay of claim 11 wherein the wireless transceiver is configured to wirelessly receive the scanning code in a Radio Resource Control (RRC) message from the source wireless access point.

17. The wireless relay of claim 11 wherein the wireless transceiver is configured to wirelessly receive the scanning code in a Radio Resource Control (RRC) Connection Reconfiguration message from the source wireless access point.

18. The wireless relay of claim 11 wherein:

the wireless transceiver is configured to receive Dynamic Host Configuration Protocol (DHCP) data generated by a Packet Data Network Gateway (P-GW); and the data processing system is configured to translate the DHCP data into the amount of degrees-per-scan.

19. The wireless relay of claim 11 wherein:

the wireless transceiver is configured to receive Dynamic Host Configuration Protocol (DHCP) server load data generated by a Packet Data Network Gateway (P-GW); and the data processing system is configured to translate the DHCP server load data into the amount of degrees-per-scan.

20. The wireless relay of claim 11 wherein:

the wireless transceiver is configured to receive Dynamic Host Configuration Protocol (DHCP) server latency data generated by a Packet Data Network Gateway (P-GW); and the data processing system is configured to translate the DHCP server latency data into the amount of degrees-per-scan.

\* \* \* \* \*